(No Model.)
J. W. BARWELL.
COFFEE POT.
No. 436,395. Patented Sept. 16, 1890.
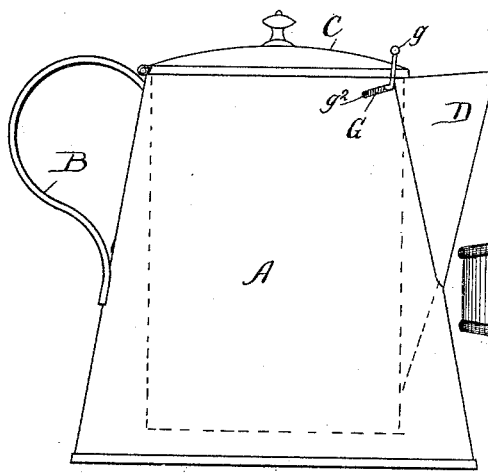
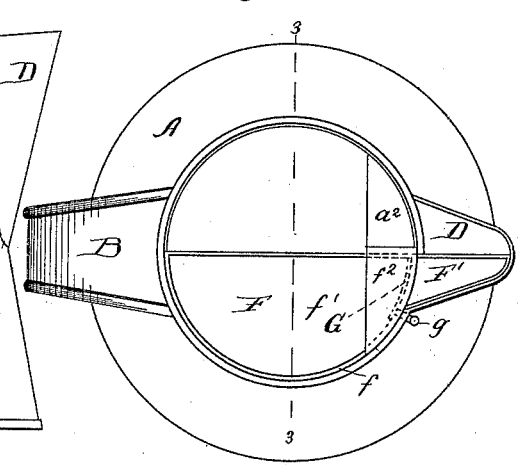
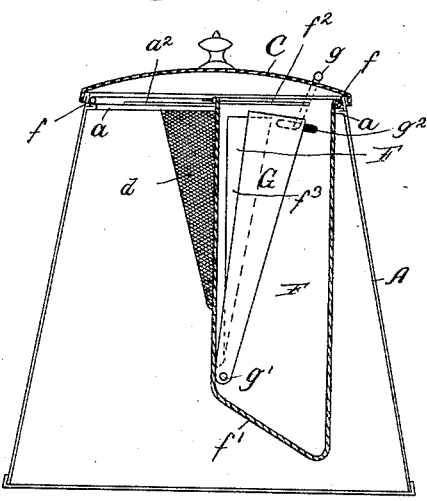
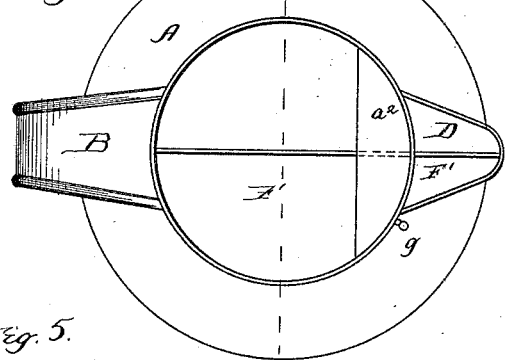
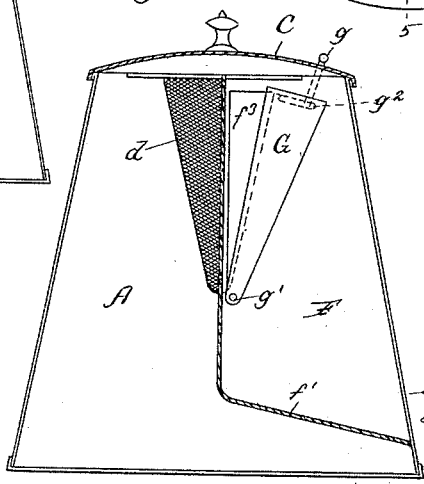
Witnesses:
Geo. C. Curtis
H. W. Munday
Inventor:
John W. Barwell
By Munday, Evarts & Adcock,
His Attorneys.

UNITED STATES PATENT OFFICE.

JOHN W. BARWELL, OF CHICAGO, ILLINOIS.

COFFEE-POT.

SPECIFICATION forming part of Letters Patent No. 436,395, dated September 16, 1890.

Application filed May 10, 1890. Serial No. 351,251. (No model.)

*To all whom it may concern:*

Be it known that I, JOHN W. BARWELL, a citizen of the United States, residing in Chicago, in the county of Cook and State of Illinois, have invented a new and useful Improvement in Coffee-Pots, of which the following is a specification.

My invention relates to improvements in coffee-pots.

It is a well-known fact that better coffee is made by simultaneously commingling or mixing hot milk or cream with the coffee than can be done where cold milk or cream is poured into the coffee, or where the milk or cream, whether hot or cold, is first poured into the cup and the coffee afterward poured in. For this reason it is frequently customary in serving coffee, even in restaurants, to bring the coffee in one jug or pot and the hot milk or cream in another, so that the coffee and hot milk or cream may be both poured at once into the cup and properly commingled.

The object of my invention is to provide a coffee-pot of a cheap, simple, and efficient construction, which will serve to contain both the coffee and the milk or cream, and maintain both at approximately the same temperature, and from which the coffee and the hot milk or cream may be simultaneously poured into a cup and properly commingled.

To this end my invention consists in the novel devices and novel combinations of parts and devices herein shown and described, and more particularly pointed out in the claims.

In the accompanying drawings, which form a part of this specification, and in which similar letters of reference indicate like parts, Figure 1 is a side elevation of a device embodying my invention. Fig. 2 is a plan view showing the pot with the cover removed. Fig. 3 is a central vertical section taken on line 3 3 of Fig. 2. Fig. 4 represents a modification, in which the milk or cream chamber is made integral with the coffee-pot by means of a partition therein; and Fig. 5 is a sectional view on line 5 5 of Fig. 4.

In the drawings, A represents a coffee-pot, B its handle, C its hinged cover, and D its spout. The coffee-pot A is furnished with a milk or cream chamber F, extending nearly, but not quite, to the bottom of the coffee-pot, so that the whole surface of the coffee-pot bottom may be utilized as a heating-surface for the coffee, and so that the milk or cream in the milk-chamber will not be subjected to undue heat. The milk chamber or compartment F preferably consists of a separate or distinct removable vessel, which fits within the coffee-pot A, and is supported in place upon an interior bead or shoulder $a$ near the top of the coffee-pot body. The removable milk-vessel F is furnished with an external bead or shoulder $f$ to rest upon the shoulder $a$. The bottom $f'$ of the milk-compartment F is preferably inclined, as is clearly shown in Fig. 3. The milk-compartment F is furnished with a pouring-spout F′, which fits within the pouring-spout D of the pot A and divides said pouring-spout D into two parts or compartments. The opening or communication between the pouring-spout F′ and the milk-compartment F is preferably furnished with a valve G, having a handle or knob $g$, projecting up around the top of the vessel and working in a slot or guide $g^2$. This valve G preferably consists of a flat plate of tin pivoted at its lower end, as shown at $g'$. By means of this valve the proportional quantity of milk or cream poured with the coffee may be readily varied or shut off entirely.

In the modification shown in Figs. 4 and 5 the milk-compartment F, instead of being made removable from the coffee-pot A, is rigidly or permanently attached thereto. In this case the milk-chamber is formed by a division-plate, the edges of which are soldered to the wall of the coffee-pot.

It will be observed that in my invention both the coffee-chamber and the milk-chamber of the pot are each furnished with its own separate pouring-spout, the two parts of the spout being combined together, so that both the coffee and the hot milk may be simultaneously poured and commingled together as they are poured, in the proper proportion. The portion of milk or coffee poured may be varied not only by the valve, but also by tilting the pot to one side or the other, as the pouring is done, according as whether a greater or less proportion of the milk or coffee is desired. As the milk-chamber extends nearly to the bottom of the coffee-pot, and as the milk and coffee in their respective chambers are or should stand at about the same level, it will be understood that the hot milk and coffee may be both very readily and uniformly poured from the pot simultaneously into the cup.

$a^3 f^2$ represent the guards at the top of the vessel near the pouring-spouts, and $d f^3$ represent the openings or communications between the pouring-spouts and the coffee and milk chambers.

I claim—

1. A coffee-pot furnished with a cream or milk chamber or compartment provided with a secondary bottom above the bottom of the pot, so that the whole bottom of the pot may be utilized for heating the coffee and prevent undue heating of the milk or cream, and a divided pouring-spout having a communication with both the coffee and milk compartments of the pot, so that both liquids may be simultaneously poured and commingled, substantially as specified.

2. A coffee-pot provided with a pouring-spout and a separately-removable milk or cream compartment adapted to fit within the coffee-pot and furnished with a separate pouring-spout fitting within the pouring-spout of the pot, so that the coffee and milk may be kept at the same temperature and simultaneously poured, said separately-removable milk or cream compartment having its bottom $f''$ above the bottom of the pot, with a space between for the coffee, substantially as specified.

3. A coffee-pot furnished with a milk or cream chamber or compartment extending part way to the bottom of the pot, and a divided pouring-spout, one division thereof having a communication with the coffee-compartment and the other division of the spout having a communication with the milk compartment of the pot, so that both liquids may be simultaneously poured and commingled, the spout-communication with the milk-compartment of the pot being furnished with a regulating-valve, the space between the bottom of the milk-compartment and the bottom of the pot being part of the coffee-compartment, so that the whole surface of the coffee-pot bottom may be utilized for heating the coffee and prevent overheating of the milk or cream, substantially as specified.

4. The combination, with a coffee-pot, of a separately-removable milk or cream chamber extending nearly to the bottom of the pot and having a separate inclined bottom of its own, and a double pouring-spout having a communication with both the coffee and milk compartments of the pot, substantially as specified.

JOHN W. BARWELL.

Witnesses:
H. M. MUNDAY,
EMMA HACK.